United States Patent
Caramaro et al.

(10) Patent No.: US 8,388,780 B2
(45) Date of Patent: Mar. 5, 2013

(54) PROCESS FOR PRODUCING A STAMPABLE REINFORCED COMPOSITE SEMI-FINISHED PRODUCT

(75) Inventors: Laurence Caramaro, Chaleins (FR); Joric Marduel, Chazay d'Azergues (FR)

(73) Assignee: Fibroline France, Ecully (FR)

( * ) Notice: Subject to any disclaimer, the term of this patent is extended or adjusted under 35 U.S.C. 154(b) by 479 days.

(21) Appl. No.: 12/294,245

(22) PCT Filed: Mar. 12, 2007

(86) PCT No.: PCT/FR2007/050916
§ 371 (c)(1),
(2), (4) Date: Sep. 24, 2008

(87) PCT Pub. No.: WO2007/110524
PCT Pub. Date: Oct. 4, 2007

(65) Prior Publication Data
US 2009/0151874 A1 Jun. 18, 2009

(30) Foreign Application Priority Data
Mar. 28, 2006 (FR) .................... 06 51075

(51) Int. Cl.
| A61F 13/15 | (2006.01) |
| B27N 3/00 | (2006.01) |
| B32B 17/00 | (2006.01) |
| B32B 5/00 | (2006.01) |
| B32B 29/02 | (2006.01) |
| B32B 37/00 | (2006.01) |
| B32B 38/04 | (2006.01) |
| B29C 65/00 | (2006.01) |

(52) U.S. Cl. .................... 156/62.2; 156/178; 156/274.6

(58) Field of Classification Search .............. 156/62.2, 156/62.4, 62.6, 62.8, 148, 166, 167, 176, 156/178, 179, 272.2, 272.6, 273.1, 273.3, 156/274.4, 274.6, 276, 283, 308.4, 309.6, 156/324, 379.6, 379.8, 380.2, 380.3
See application file for complete search history.

(56) References Cited

U.S. PATENT DOCUMENTS
(Continued)

FOREIGN PATENT DOCUMENTS
| EP | 086687 A | 8/1983 |
| EP | 1525969 A | 4/2005 |

(Continued)

OTHER PUBLICATIONS

The International Search Report for PCT/FR2007/050916, dated Aug. 29, 2007.

*Primary Examiner* — Philip Tucker
*Assistant Examiner* — Brian R Slawski
(74) *Attorney, Agent, or Firm* — Heslin Rothenberg Farley & Mesiti P.C.

(57) ABSTRACT

A process for producing a stampable reinforced composite semi-finished product comprising one or more plastics and chopped fibers or continuous filaments, the softening temperature of which is above the highest of the softening temperatures of the materials, comprises the steps of: depositing the fibers or filaments, especially by gravity, onto a conveyor; sprinkling particles of a powder of the plastics onto the fibers or the filaments, in a proportion of between 5% and 90% of the total weight; blending the particles with the fibers or the filaments; and heating the blend to a temperature above the softening temperatures of the materials. The blending step includes subjecting the blend to at least one electric field approximately perpendicular to the direction of advance of the conveyor.

17 Claims, 1 Drawing Sheet

U.S. PATENT DOCUMENTS

| | | | | |
|---|---|---|---|---|
| 4,487,647 A * | 12/1984 | Semeghini et al. | | 156/181 |
| 6,793,747 B2 * | 9/2004 | North et al. | | 156/62.2 |
| 2003/0082361 A1 * | 5/2003 | Jander | | 428/300.7 |
| 2005/0082721 A1 * | 4/2005 | Haque et al. | | 264/324 |
| 2006/0233966 A1 * | 10/2006 | Marduel | | 427/475 |

FOREIGN PATENT DOCUMENTS

| | | |
|---|---|---|
| EP | 1526214 A | 4/2005 |
| EP | 1526214 A1 * | 4/2005 |

* cited by examiner

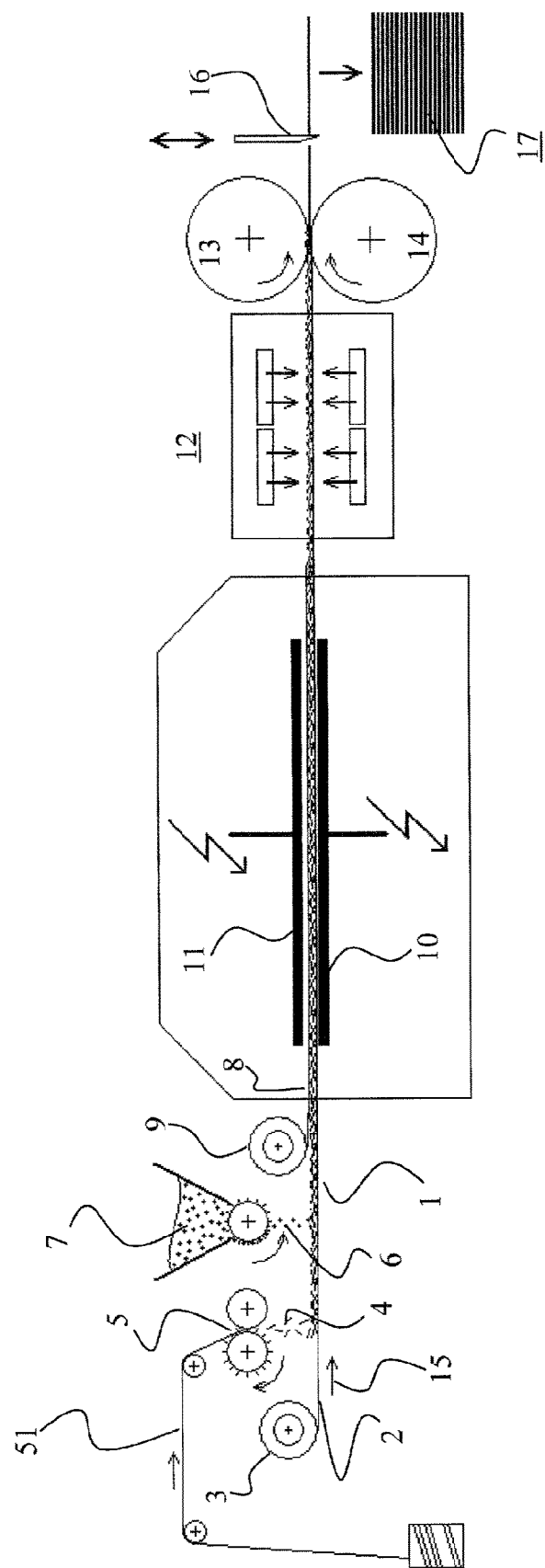

PROCESS FOR PRODUCING A STAMPABLE REINFORCED COMPOSITE SEMI-FINISHED PRODUCT

CROSS REFERENCE TO RELATED APPLICATIONS

This application is a national stage filing under section 371 of International Application No. PCT/FR2007/050916, filed on Mar. 12, 2007, and published in French on Oct. 4, 2007, As WO 2007/110524 and claims priority of French application No. 0651075 filed on Mar. 28, 2006, the entire disclosure of these applications being hereby incorporated herein by reference.

TECHNICAL FIELD

The present invention relates to a process for preparing a fibre-reinforced plastic composite semi-finished product. More specifically, the present invention relates to a process in which the plastics forming the binder of the semi-finished product are used in powder form.

The term "plastic" means any synthetic material based on the use of macromolecules and transformable by moulding, forming or casting, generally with the use of heat and pressure.

PRIOR ART

In conventional processes for manufacturing composite semi-finished products, such as the process described in document U.S. Pat. No. 4,487,647, the binder of the semi-finished product may be mixed with the reinforcing filaments or yarns in pulverulent form. The yarns are first deposited, generally by gravity, onto a conveyor, thus forming a kind of mattress, and are then sprinkled with particles of the binding plastic powder, followed by heating the assembly so as to melt the binding plastic. The assembly is then cooled to obtain the reinforced stampable composite semi-finished product.

Such a semi-finished product is termed "composite" since it results from a mixture of yarns or fibres of a given material with a plastic binder made of another material. The yarns give the composite semi-finished product its reinforced nature, since, in a known manner, they contribute appreciably towards the mechanical properties of the composite.

Furthermore, the product derived from the process that is the subject matter of the present invention is termed a "semi-finished product" since it is in a raw form that can and must be reworked to obtain the final composite components capable of satisfying a given mechanical and/or chemical function, for instance resilience or chemical inertness. This is why these semi-finished products are often referred to as reinforced stampable thermoplastics (or "Glass Mat Thermoplastics" or GMT).

Moreover, the semi-finished product is said to be "stampable" since it is generally in the form of plaques which can be subsequently formed in suitable moulds. It is thus possible to form components of very diverse and complex geometries in order to satisfy specific functions.

However, in the prior art processes, the mixing of the powder particles with the fibres or yarns is not performed entirely satisfactorily, and, when it is, this requires relatively laborious operations. Thus, the mixing operations may be performed using techniques such as needle-punching or cycloning.

Needle-punching consists in pricking with needles several times the mixture of the fibre mattress and the powder, so as to bind the fibres together by "interlacing" and thereby homogenize the distribution of the particles within the fibres.

However, such needle-punching is relatively complex to perform. This is because it may give rise to pollution of the ambient medium and the presence of impurities when the nature of the plastics used is changed so as to produce a different composite semi-finished product. Such a process thus requires confinement of the powders and fibres or complete cleaning of the production plant before the production of a new semi-finished product. Furthermore, to obtain a satisfactorily homogeneous mixture, it is necessary for the powder particles to be relatively fine, which increases the cost of the raw materials used.

Moreover, it is possible to mix by cycloning the pre-chopped fibres with powder particles. The mixture is then layered by pneumatic spraying, followed by passing the assembly through an oven so as to soften and fix the powder, which can then fulfil its binding resin function.

However, cycloning is a technique reserved for large production volumes, since it requires expensive and bulky equipment, including cyclones. In addition, it requires a similar density between the fibre and powder components to correctly homogenize the mixture. Specifically, in a known manner, a cyclone separates the light particles from the heavy particles. Thus, it is not possible to prepare a mixture of glass fibres, of relatively high density, with plastic-based powder particles. Furthermore, some of the lightest particles are inevitably carried away through the air evacuation of the cyclone and therefore cannot be introduced into the mixture.

Finally, cycloning allows only relatively short fibres to be mixed with powder. To prepare a homogeneous mixture between yarns and powder while avoiding the problems mentioned above, document U.S. Pat. No. 4,487,647 proposes to use a relatively long and complex process, since it includes three heating steps, three powder deposition steps and two compression steps. Such a process thus requires the use of a long and expensive production line, which accordingly increases the cost of the composite semi-finished product resulting from such a process.

Moreover, although they achieve good homogeneity of the mixture between the powder materials and fibres at the expense of complex operations, the prior art processes nevertheless remain limited to specific sizes of powder particles and of reinforcing fibres. Thus, for a certain size of fibres, it is necessary to use a powder whose particle size is selected such that the maximum diameter of these particles is limited to 500 µm or even to 200 µm, as in the case of document U.S. Pat. No. 4,487,647. However, the use of powder with a fine particle size also has repercussions on the cost price of the composite semi-finished product.

Conversely, if a powder that is too coarse is selected, the mixture of the particles with the fibres risks being too heterogeneous, to the point that the composite semi-finished product risks having reduced or even defective mechanical properties.

The aim of the present invention is thus to propose a process for preparing a reinforced stampable composite semi-finished product, whose implementation does not require an overly laborious blending or mixing sequence, nor an overly rigorous selection of the particle size of the binding plastic powder.

SUBJECT OF THE INVENTION

The present invention is thus directed towards a process for the simple, relatively quick and economical preparation of a composite semi-finished product. The process that is the subject matter of the invention is directed towards preparing a reinforced stampable composite semi-finished product comprising one or more plastics and chopped fibres or continuous filaments, preferably made of one or more electrically non-conductive materials, the softening point of which is higher than the highest of the softening points of the said materials. The process that is the subject matter of the invention comprises the steps consisting in:

- depositing the fibres or the filaments, especially by gravity, onto a conveyor;
- sprinkling particles of a powder of the said plastics onto the fibres or the filaments, in a proportion of between 5% and 90% of the total weight;
- mixing the particles with the fibres or the filaments;
- bringing the mixture to a temperature above the softening points of the materials, so as to form the semi-finished product.

According to the invention, the mixing step includes subjecting the mixture to at least one electric field substantially perpendicular to the direction of advance of the conveyor and capable of moving the particles and the fibres or the filaments so as to homogenize the mixture.

In other words, the mixing or blending of the powder particles with the fibres or filaments is performed by means of at least one electrical field that displaces and agitates the powder particles, and to a lesser extent the fibres, in the direction of the thickness of the mattress of fibres or filaments deposited on the conveyor. Thus, the mixture can be made satisfactorily homogeneous by means of the electrostatic forces that are exerted on the particles and on the fibres or filaments, these forces improving the impregnation of the particles between the fibres. The term "substantially perpendicular field" thus means a field in a direction transverse to the conveyor, capable of displacing the powder particles in the thickness of the fibre mattress. To do this, the field should have a component that is perpendicular to the conveyor.

According to one embodiment of the invention, the electrical field may have an alternating voltage with a frequency of between 2 Hz and 500 Hz and an amplitude of between 100 kV/m and 80 000 kV/m.

Such an electrical field allows efficient blending of the powder particles in the middle of the fibres. Specifically, an alternating field can cause oscillating displacements of the particles, which has a tendency to efficiently homogenize the mixture.

According to one embodiment of the invention, the mixing step may include subjecting the mixture to a plurality of electrical fields. In this embodiment, two arrays of electrodes are respectively arranged on either side of the conveyor, each of the arrays of electrodes comprising a plurality of electrodes arranged successively in the direction of advance of the conveyor. Each of the electrical fields is generated between two electrodes belonging respectively to one and the other of the two arrays of electrodes.

According to one particular implementation form of this embodiment of the invention, the electrical fields may be derived from continuous voltages and may be oriented in opposite directions successively in the direction of advance of the conveyor. The successive fields may also be of different intensity from one to another, to give rise to differential blending effects.

Such an embodiment and such an implementation form allow efficient blending of the powder and the fibres or filaments.

In practice, the field may be generated between electrodes which are globally flat and mutually parallel.

Such an electrode geometry makes it possible to generate an electrical field suitable for mixing the powder and the fibres over the entire surface of the composite semi-finished product that it is desired to produce.

According to one practical embodiment of the invention, the plastics may be thermoplastics chosen from the group comprising polyethylene, polypropylene, polyamides, polyesters, for instance polybutylene terephthalate, polylactic acid compounds, polyvinyl chloride, polyetherimides, copolyamides and copolyesters.

According to an alternative embodiment of the invention, the plastics may be thermosetting materials chosen from the group comprising unsaturated polyesters, polyepoxides, melamine-based compounds and phenolic compounds.

Such thermoplastic or thermosetting materials have dielectric properties that make them capable of being mixed by the characteristic electrical field of the invention.

In practice, the powder and/or the fibres or filaments may comprise additives and/or fillers intended for imparting specific properties to the semi-finished product, for instance a low density, a flame-retardant or antibacterial nature, or for reducing the overall cost of the powder.

It may in point of fact prove useful to add fillers, especially functional fillers, to the semi-finished product for certain applications.

According to the invention, the powder may have a particle size of between a minimum diameter of 0.1 μm and a maximum diameter of 3000 μm, preferably between a minimum diameter of 0.1 μm and a maximum diameter of 1000 μm.

Such a particle size, which is characteristic of a sparingly selected powder, makes it possible to rapidly impregnate large amounts of powder into the fibre mattress, without excessively increasing the cost.

In practice, the fibres may have a diameter of between 1 μm and 100 μm and preferably between 10 μm and 50 μm, and a length of between 2 mm and 200 mm and preferably between 10 mm and 70 mm.

These fibre sizes also make it possible to achieve homogeneous mixing with the powder particles.

According to the invention, the fibres or the filaments may consist of one or more materials chosen from the group comprising glass, flax, jute, sisal, high-strength polyethylene, ceramic fibres and aramid fibres.

Such electrically non-conductive materials allow the process that is the subject matter of the invention to be performed.

According to one particular embodiment of the invention, the fibres or the filaments may be deposited on the conveyor onto a lower layer, an upper layer possibly being deposited onto the mixture of fibres and powder, these layers comprising one or more plastics whose softening point is below the softening point of the fibres, these layers (2, 8) each also having a thickness of between 5 μm and 500 μm.

The addition of such layers prevents the conveyor from being soiled or degraded, since it confines the powder and the fibres. Thus, very few particles or fibres become deposited directly on the conveyor. These lower and upper layers also make it possible to rapidly change the nature of the materials or matter forming the composite semi-finished product, since they limit the pollution of the components of the production line such as the conveyor. Furthermore, such layers, which form the outer "skins" of the semi-finished product, can give the composite semi-finished product specific characteristics such as chemical resistance, high adhesion or the quality of the outer appearance of the semi-finished product.

According to another embodiment, the process may also comprise steps consisting in superposing additional strata relative to that formed by the mixture of fibres and of powder.

These strata are intended to impart various mechanical, chemical or other properties to the semi-finished product.

In other words, the composite semi-finished product may be formed from several superposed layers of fibres coated with binding resin.

BRIEF DESCRIPTION OF THE FIGURES

The manner in which the invention may be performed and the advantages arising therefrom will emerge more clearly from the production example that follows. This example is given as a non-limiting guide, supported by the attached FIGURE.

The FIGURE is a diagrammatic representation in cross section of a device capable of performing the process that is the subject matter of the invention.

EMBODIMENT

The FIGURE thus illustrates a composite semi-finished product production line according to one embodiment of the process that is the subject matter of the present invention. In this production line, a conveying device 1 consists of a conventional conveyor whose belt advances in the direction indicated by the arrow 15.

During the first step illustrated by the FIGURE, a lower layer 2 is deposited on the conveyor belt 1. The lower layer 2 is in this case in the form of a film wound on a roll 3 and which unrolls synchronously with the advance of the conveyor 1.

In accordance with the invention, the lower layer 2 comprises a plastic whose softening point is lower than that of the reinforcing fibres of which the semi-finished product obtained according to the process that is the subject matter of the invention is composed. This lower layer 2 is made cohesive with the rest of the composite semi-finished product during the heat treatment step described below.

The second step of the process illustrated by the FIGURE consists in depositing on the conveyor belt 1 fibres 4 of which the composite semi-finished product is composed. In the present case, the fibres 4 are deposited on the conveyor 1 solely by the effect of gravity. The fibres 4 thus form a kind of non-cohesive [lacuna] on the conveyor 1. However, another deposition mechanism may be envisaged without, however, departing from the scope of this invention.

In accordance with one characteristic of the invention, the fibres 4 are 50 mm long and 17 µm in diameter. It is possible to use a mixture of fibres of different sizes, according to the properties that it is desired to give to the semi-finished product derived from the process that is the subject matter of the invention, and thus as a function of its final use.

In the example of the FIGURE illustrating one embodiment of the process that is the subject matter of the invention, the fibres 4 consist of an electrically non-conductive material. They are in this instance glass fibres E obtained by chopping roving or locks of fibres with a linear density of 2400 tex (i.e. 2400 g per 1000 m), using the chopper 5 operating at a speed synchronized with the advance 15 of the conveyor 1. Moreover, the fibres 4 are sized with a size that is compatible with the pulverulent material used as described below. In the example of FIG. 1, the conveyor is set at an advance speed of 2 m/min.

It may also be envisaged to prechop the glass fibres using a separate chopper that is remote from the production line illustrated in the FIGURE. In this case, the prechopped fibres may be simply placed on the conveyor 1 by means of a distributor operating at a feed rate resulting in a basis weight of 1200 g/min.

Moreover, the fibres 4 may also comprise one or more other materials, which are preferably non-conductive, such as flax, jute, sisal, high-strength polyethylene, ceramic fibres and aramid fibres. It is also possible to use fibres of semiconductive or even conductive materials, provided that their presence, and in particular their proportion relative to the powder and the other fibres, proves compatible with the electric field used in the mixing step described below.

Other non-fibrous products may also be used to perform the process that is the subject matter of the invention, for instance feathers of natural origin capable of giving the semi-finished product their insulating characteristics.

Moreover, it is also possible to use a mixture of fibres of different natures and/or sizes, according to the properties to be given to the semi-finished product derived from the process that is the subject matter of the invention, and thus as a function of its final use. It is also possible, without, however, departing from the scope of this invention, to use a preformed lap of fibres very weakly bound together. This lap may be formed beforehand or in replacement for the step of versing of the fibres 4.

Similarly, relatively long fibres, or even continuous yarns or filaments in the form of a one-directional lap, may be used. Such a lap of continuous filaments may replace the fibres or may be added thereto before or after the fibre deposition step described above.

In the course of the following step of the process that is the subject matter of the invention, the fibre "mattress" is sprinkled with particles 6 of a powder consisting of one or more plastics intended to serve as binder between the fibres 4 for the final composite semi-finished product. In the present case, the material used is polypropylene.

In the case of the FIGURE, the particles 6 are deposited on the glass fibres 4 and the lower layer 2 simply by the effect of gravity. A sprinkling device 7 meters the feed rate of these powder particles 6 synchronously with the advance 15 of the conveyor 1. The sprinkling device 7 operates at a feed rate that makes it possible to obtain the desired proportion between fibres 4 and powder 6, in the present case at a feed rate of 800 g/min.

In the example of the FIGURE, the ratio of the mass of the powder 6 relative to the total weight of the fibres 4 with the powder 6 is 60%. This mass ratio is determined as a function of the weight per unit area, or basis weight, that is desired for the final composite semi-finished product. The weight per unit area of the semi-finished products obtained according to the process that is the subject matter of the invention may range from 50 g/m$^2$ to 10 000 g/m$^2$.

According to one characteristic of the invention, the plastics of which the powder 6 is made each have a softening point substantially lower than that of the fibres 4. This quite simply prevents the fibres 4 from melting with the binding plastics during the heat treatment step described below. The reason for this is that it is important for the fibres to remain intact in the final composite semi-finished product in order to give it the desired mechanical strength properties.

Many other thermoplastics are suitable for making the powder 6, among which mention may be made of polyethylene, polypropylene, polyamides, polyesters, for instance polybutylene terephthalate, polylactic acid compounds, polyvinyl chloride, polyetherimides, copolyamides and copolyesters. Similarly, many thermosetting materials may be suitable, for instance unsaturated polyesters, polyepoxides, melamine-based compounds and phenolic compounds.

It may also be envisaged to add fillers, of organic or inorganic nature, to the pulverulent material(s) so as to give the semi-finished product specific properties, for instance a low density, a flame-retardant or antibacterial nature, or to be able to reduce the overall cost of the powder, etc. These fillers may be mixed with the powders used as binder or may be incorporated during another step.

The following step of the process consists, like the first step described in relation to the FIGURE, in depositing an upper layer 8 on the components already present on the conveyor 1. Just like the lower layer 2 and for the same reasons, the upper layer 8 consists of plastics whose softening points are lower than those of the fibres 4. It may be a polyolefin-based material, which is chemically inert.

Similarly, the upper layer 8 is also deposited in film form at a speed that is synchronous with the speed 15 of the conveyor 1. The upper layer 8 is also stored in the form of a roll unwound by a distributor 9.

The sizes and the constituent materials of the layers 2 and 8 are obviously selected as a function of the desired use. Advantageously, the layer 2 may have a width equal to the width of the final composite semi-finished product so as to prevent the transporting belt of the conveyor 1 from becoming soiled or polluted when the fibres 4 and the powder 6 are deposited thereon. This characteristic makes it possible to pass quickly from one semi-finished product to another.

Since the layers 2 and 8 form the outer "skins" of the final composite semi-finished product, they may also fulfil "surface" functions associated with its appearance, its adhesiveness or its chemical resistance. These layers may each have a thickness of between 5 μm and 500 μm. In the present case, the thickness of the layer 2 and that of the layer 8 is about 50 μm.

In addition, one and/or the other of the layers 2 and 8 may consist of a two-layer or multilayer film, made of different co-extruded materials, for instance polypropylene with a copolyamide compound. The role of such multilayer materials is to ensure, firstly, cohesion with the core of the semi-finished product comprising fibres and binding resin powder, and, secondly, surface functions such as those mentioned previously.

Moreover, one and/or the other of these layers may also be formed by other components such as grilles or by textile products of the nonwoven type. Since the functions of these components are determined by the final application of the semi-finished product, many components may be included in the composition of the layers 2 and 8.

The following step consists in intimately mixing the fibres 4 with the powder 6 so as to impregnate the fibre mattress homogeneously with the particles 6 of the powder forming the binder. To do this, and according to one characteristic of the process that is the subject matter of the invention, the mixture of the fibres 4 with the powder 6 is subjected to an electric field generated between electrodes 10 and 11, which are globally flat and mutually parallel in the direction perpendicular to the FIGURE. The powder particles 6 and the fibres 4 are then placed in motion, globally along the field lines.

Specifically, in a known manner in the field of electrostatic powdering, an electric field ionizes the dioxygen molecules of the air, which become bound to the powder particles, of which the charge thus formed depends on the dielectric permittivity of the material constituting them. This is why it is preferable to use low-conducting plastics in order to satisfactorily place the powders in motion. However, conductive fillers may be used as a mixture or during a subsequent sprinkling.

As a function of the weight per unit area, or basis weight, desired for the final composite semi-finished product, the electrodes 10 and 11 must be spaced apart by a distance of between 0.5 mm and 70 mm. As regards the rest, it may be envisaged to mount at least one of the electrodes 10 and 11 on a mobile support so as to adapt their spacing as a function of the thickness of the semi-finished product to be made.

To avoid reaching the disruptive voltage of the air between the electrodes under tension, it may be envisaged to coat them with an insulating material whose dielectric permittivity is high enough to withstand the generated field. Specifically, for obvious reasons, it is desirable not to generate an electric arc between the electrodes.

To prepare a homogeneous mixture between the fibres 4 and the powder particles 6, an electric field with an alternating voltage of sinusoidal form, the frequency of which is 50 Hz, is used. Furthermore, the electric field generated in the example illustrated by the FIGURE has an amplitude of 10 000 kV/m.

Such characteristics of the electric field make it capable of moving the particles 6 and the fibres 4. When such an electric field is applied between the electrodes 10 and 11, not only the particles 6, but also, to a lesser extent, the fibres 4 are placed in motion. The reason for this is that the fibres 4, which are chopped or in continuous filaments, are not yet bound together, and as such they are capable of moving under the effect of the electric field generated between the electrodes 10 and 11.

According to other embodiments, the alternating voltage of the electric field may have a triangular, square or pulsed form or a more complex form. The wave form obviously has an influence on the homogeneity of the mixture between the powder and the fibres, to the extent that it may be determined as a function of the components of the semi-finished product and of the properties that it is desired to impart thereto.

Also alternatively, it may be envisaged to install several electrodes arranged successively in the direction of advance 15 of the conveyor 1. Thus, it is possible to prepare the mixture by generating a succession of electric fields between the electrodes located on each side of the conveyor 1 and relatively narrow in the direction of advance 15. It is then necessary to orient the fields in successive pairs in one direction and in the other, i.e. upwards and downwards, thus forming "antiparallel" fields. This makes it possible to efficiently homogenize the mixture between the fibres 4 and the powder 6, since the movement of the particles 6 and of the fibres 4 takes place gradually as the conveyor 1 advances, alternately in one direction and then in the opposite direction. As a function of the desired properties and/or of the materials and matter used, the successive electric fields may be derived from direct or alternating voltages and may have various amplitudes and/or orientations, insofar as they have a component perpendicular to the conveyor 1.

It is also possible to install electrodes having a different shape, i.e. non-planar. Thus, tubular electrodes may be used, such as those described in document WO 2005/038123, arranged successively in the direction of advance 15 of the conveyor 1 and subjected to alternating voltages. The geometry and arrangement of these electrodes must in any case favour the components of electric field perpendicular to the conveyor 1, so as to efficiently homogenize the mixture between the fibres 4 and the powder particles 6.

As a function of the amount of powder deposited on the fibre mattress and of the duration and amplitude of the treatment with the electric field, the powder may move substantially and, under certain conditions, accumulation of an excess of powder on the outer surfaces of the layers 2 and 8 may be seen. A surface state suitable for bonding during the use of the semi-finished product is thus created.

In any case, the potential difference between the electrodes 10 and 11 may be adjusted between these minimum and maximum values as a function of the characteristics of the composite semi-finished product, in particular its thickness and the nature of the materials of which it is made.

The following step is a heat treatment step, which is standard in processes for manufacturing composite semi-finished products. In general, such a heat treatment is accompanied or followed by pressing of the semi-finished product. The combination of these heat treatment and pressing steps is often referred to as "calendering".

In the example of the FIGURE, the heating of the semi-finished product is performed by a thermal convection oven and its pressing is performed between two pressing rolls 13 and 14.

The sequencing of the heating, pressing and optional cooling steps should be determined as a function of the semi-finished product that it is desired to obtain. In all cases and in accordance with one characteristic of the invention, it is important to bring the mixture to a temperature above the softening points of the plastics constituting the binding powder 6 and the lower 2 and upper 8 layers of the semi-finished product. This effectively makes it possible to make these materials viscous and thereby to ensure their distribution and cohesion in the fibres 4. The semi-finished product is then cooled to room temperature.

Furthermore, in the case of a thermosetting material, the heating temperature should be below the crosslinking temperature so as to be able to form the final product during a subsequent step not shown in the FIGURE. This is made possible since most of the thermosetting plastics each pass, during their heating, through a "pseudoplastic" state characterized by reversible softening at a temperature much lower than the crosslinking temperature.

Typically, the heating temperatures during the calendering step may range from 100° C. to 400° C. depending on the nature of the materials used. Thus, for example, heating above 160° C. must be performed to reach the melting point of polypropylene and beyond 180° C. to reach that of polylactic acid, or beyond 220° C. to reach that of polyamide 6.

This optional step of pressing with the pressing rolls 13 and 14 also serves to conform the products to the final thickness desired for the semi-finished product.

Moreover, the transporting belt of the conveyor 1 should have mechanical characteristics that allow its entrainment and resistance to pressing of the semi-finished product, but also chemical resistance to oxidation with ozone produced during the ionization of air under the effect of the electric field. In the example of the FIGURE, the transporting belt consists of a woven support coated on both faces with polytetrafluoroethylene, but an assembly of polyurethane on glass or polyester may also be used.

As in the case of the conventional manufacturing processes, the speed of advance 15 of the conveyor 1 is adjusted as a function of parameters such as the basis weight of the semi-finished product, the softening point of the binding materials and those of the layers 2 and 8, or alternatively the dimensions of the machine and the time required for treatment in the electric field.

Moreover, the process that is the subject matter of the invention may be performed to produce a composite semi-finished product comprising several superposed layers. To do this, it may be envisaged, for example, to replace one of the rolls forming the layers 2 or 8 with a roll already comprising a fibre-reinforced composite semi-finished product. A stratified composite semi-finished product having several strata of superposed fibres is thus obtained.

Moreover, as a function of the desired uses and without departing from the scope of this invention, it may be envisaged to superpose other strata relative to that formed by the mixture of fibres 4 and of powder 6. It may thus be a case of porous structures, for instance mousses or honeycomb structures, but also textile structures, for instance nonwovens, fabrics or unidirectional structures. These strata may thus impart various mechanical, chemical or other properties to the semi-finished product.

Many other superpositions of the layers relative to the mixture of fibres and powder may also be envisaged. Thus, a semi-finished product composed of fibres and powder made by means of the process that is the subject matter of the invention may constitute one of the layers 2 or 8 so as finally to form a sandwich structure.

All these superpositions or insertions have in common in all cases the mixing step, which is characteristic of the invention, using an electric field. To prepare the two mixtures mentioned above, it is obviously necessary to double the steps of changing versing of fibres and of sprinkling.

Thus, a composite semi-finished product, made of fibre-reinforced plastic resin, prepared according to the process that is the subject matter of the invention is in the form of plaques 17 cut in a calibrated manner with a tool 16 and then accumulated at the end of the production line. As a function of the nature of the materials used, the semi-finished product may also be rolled up, which may facilitate its transportation, handling and/or use.

The semi-finished product, as a plaque or roll, is subsequently transformed by drawing or stamping, i.e. by a treatment that generally combines heating and pressing in a mould. The composite products thus moulded have well-known properties of lightness, rigidity, impact strength, etc. Thus, such a composite product may form an absorption bar for a motor vehicle bumper.

The characteristic parameters of the process that is the subject matter of the invention, such as the feed rate of the deposited fibres, the feed rate of the sprinkled particles, the speed of advance of the conveyor, etc. are determined as a function of the respective mixed proportions and masses per unit volume of the constituent materials of the fibres and of the constituent materials of the powders, so as to obtain the basis weight desired for the said product, generally of between 50 $g/m^2$ and 5000 $g/m^2$.

The invention claimed is:

1. Process for preparing a reinforced stampable composite semi-finished product comprising one or more plastics and chopped fibres or continuous filaments, made of one or more materials, comprising the steps of:
    (a) depositing the fibres or the filaments onto a film on a conveyor;
    (b) sprinkling particles of a powder of the plastics onto the fibres or the filaments, in a proportion of between 5% and 90% of the total weight;
    (c) depositing an upper film onto the powder and the fibres or filaments;
    (d) mixing the particles with the fibres or the filaments to form a mixture; and
    (e) bringing the mixture to a temperature above the softening points of the plastics, so as to form the semi-finished product;

wherein the mixing step (d) is performed after (c) and before (e), and includes subjecting the mixture to at least one electric field substantially perpendicular to a direction of advance of the conveyor, the field moving the particles and the fibres or the filaments so as to homogenize the mixture; and wherein the upper film of (c) forms an outer layer of the reinforced stampable composite semi-finished product.

2. Process according to claim 1, wherein the said electric field has an alternating voltage with a frequency of between 2 Hz and 500 Hz and an amplitude of between 100 kV/m and 80,000 kV/m.

3. Process according to claim 1, wherein the mixing step (d) includes subjecting said mixture to a plurality of electric fields, two arrays of electrodes being respectively arranged on either side of the conveyor, each of said arrays of electrodes comprising a plurality of electrodes arranged successively in the direction of advance of said conveyor, and wherein each of said electric fields is generated between two electrodes belonging respectively to one and the other of the said two arrays of electrodes.

4. Process according to claim 3, wherein said electric fields are derived from continuous voltages and are oriented in opposite directions successively in the direction of advance of said conveyor.

5. Process according to claim 1, wherein said electric field is generated between electrodes which are globally flat and mutually parallel.

6. Process according to claim 1, wherein the said plastics are thermoplastics chosen from the group consisting of polyethylene, polypropylene, polyamides, and polyesters.

7. Process according to claim 1, wherein said plastics are thermosetting materials chosen from the group consisting of unsaturated polyesters, polyepoxides, melamine-based compounds and phenolic compounds.

8. Process according to claim 1, wherein said powder comprises additives and/or fillers for imparting specific properties to the semi-finished product.

9. Process according to claim 1, wherein said powder has a particle size of between a minimum diameter of 0.1 μm and a maximum diameter of 3000 μm.

10. Process according to claim 1, wherein said fibres have a diameter of between 1 μm and 100 μm, and a length of between 2 mm and 200 mm.

11. Process according to claim 1, wherein said fibres or said filaments consist of one or more materials chosen from the group comprising glass, flax, jute, sisal, high-strength polyethylene, ceramic fibres and aramid fibres.

12. Process according to claim 1, wherein said materials are electrically non-conductive.

13. Process according to claim 1, wherein said depositing is accomplished by gravity.

14. Process according to claim 1, wherein the plastics are thermoplastics chosen from the group consisting of polybutylene terephthalate, polylactic acid compounds, polyvinyl chloride, polyetherimides, copolyamides and copolyesters.

15. Process according to claim 8, wherein said properties include a low density, a flame-retardant or antibacterial nature, or for reducing the overall cost of the powder.

16. Process according to claim 9, wherein said powder has a particle size between a minimum diameter of 0.1 μm and a maximum diameter of 1000 μm.

17. Process according to claim 10, wherein said fibres have a diameter between 10 μm and 50 μm and a length of between 10 mm and 70 mm.

\* \* \* \* \*